(12) United States Patent
Crampton et al.

(10) Patent No.: US 11,672,233 B2
(45) Date of Patent: Jun. 13, 2023

(54) TOY / TRAINING TOOL FOR ANIMAL CONTAINMENT ASSEMBLY

(71) Applicant: Diggs Inc., Long Island City, NY (US)

(72) Inventors: Zel Alexander Crampton, Brooklyn, NY (US); Jacqueline Prehogan, Toronto (CA); Isaac Langleben, Toronto (CA); Benjamin J. Beck, Boston, MA (US); Michael T. McDuffee, Malden, MA (US); Ryan J. Donovan, Newton, MA (US); Douglas A. Marsden, Marblehead, MA (US); Courtney Armstrong, Long Island City, NY (US)

(73) Assignee: Diggs Inc., Long Island City, NY (US)

( * ) Notice: Subject to any disclaimer, the term of this patent is extended or adjusted under 35 U.S.C. 154(b) by 11 days.

(21) Appl. No.: 17/492,279

(22) Filed: Oct. 1, 2021

(65) Prior Publication Data

US 2022/0022423 A1    Jan. 27, 2022

Related U.S. Application Data

(63) Continuation of application No. PCT/US2020/061505, filed on Nov. 20, 2020.

(60) Provisional application No. 62/938,597, filed on Nov. 21, 2019.

(51) Int. Cl.
*A01K 15/02*    (2006.01)

(52) U.S. Cl.
CPC .................. *A01K 15/025* (2013.01)

(58) Field of Classification Search
CPC ... A01K 1/0356; A01K 39/0106; A01K 5/015
USPC ....... 119/464, 475, 477, 466, 707, 708, 709, 119/702, 465; 446/227
See application file for complete search history.

(56) References Cited

U.S. PATENT DOCUMENTS

| 385,650 | A | * | 7/1888 | Wemple | ............. | A01K 39/0106 |
| | | | | | | 248/229.12 |
| 1,826,943 | A | | 10/1931 | Maker | | |
| 1,979,057 | A | * | 10/1934 | Tomlinson | ......... | A01K 39/0106 |
| | | | | | | 119/464 |

(Continued)

FOREIGN PATENT DOCUMENTS

| AU | WO1995025902 A1 * | 9/1995 | ............... A47F 5/08 |
| WO | 2021102262 | 5/2021 | |

OTHER PUBLICATIONS

International Search Report, PCT Patent Application No. PCT/US2020/061505, dated Feb. 10, 2021.

(Continued)

*Primary Examiner* — Peter M Poon
*Assistant Examiner* — Jeffrey R Larsen
(74) *Attorney, Agent, or Firm* — Kilpatrick Townsend & Stockton LLP

(57) ABSTRACT

A toy that can be placed on an animal crate as an on-crate treat delivery system. The toy can encourage low-energy positive reinforcement for animals acclimating to a new crate. The toy can be supported by a mesh network of the crate to provide an off-the-ground design that provides a treat to an animal inside the crate and helps keep an animal bed clean by not encouraging licking or chewing the bed. The toy can also be used facing outward from the crate, utilizing the crate as an elevated post for treat consumption.

20 Claims, 9 Drawing Sheets

(56) References Cited

U.S. PATENT DOCUMENTS

| | | | |
|---|---|---|---|
| 2,612,165 A | 9/1952 | Szuderski | |
| 2,773,473 A * | 12/1956 | Martin | A01K 1/0356 |
| | | | 119/464 |
| 4,192,307 A | 3/1980 | Baer | |
| 4,669,421 A * | 6/1987 | Flintjer | A01K 39/0106 |
| | | | 119/466 |
| 5,395,392 A | 3/1995 | Suhonen | |
| 5,474,031 A | 12/1995 | David et al. | |
| D382,643 S | 8/1997 | Cummings | |
| D391,644 S | 3/1998 | Fletcher | |
| D392,389 S | 3/1998 | Fletcher | |
| D451,650 S | 12/2001 | Kaplan | |
| 6,361,552 B1 | 3/2002 | Badalamenti et al. | |
| 6,776,122 B1 * | 8/2004 | Magrath | A01K 39/0106 |
| | | | 119/467 |
| 6,863,681 B2 | 3/2005 | Dickerson | |
| D529,667 S | 10/2006 | Axelrod | |
| D530,481 S | 10/2006 | Koenig et al. | |
| D544,177 S | 6/2007 | Beecham | |
| D584,476 S | 1/2009 | Caudill et al. | |
| D584,477 S | 1/2009 | Caudill et al. | |
| D590,127 S | 4/2009 | Caudill et al. | |
| D593,203 S | 5/2009 | Kliegman et al. | |
| D610,691 S | 2/2010 | Benedetto | |
| D638,606 S | 5/2011 | Freije | |
| D688,012 S | 8/2013 | Canello et al. | |
| 8,523,127 B1 * | 9/2013 | Bennett | A63B 71/0036 |
| | | | 248/222.52 |
| D710,020 S | 7/2014 | Bredemeier et al. | |
| D724,275 S | 3/2015 | Avalos Sartorio et al. | |
| D740,518 S | 10/2015 | Axelrod et al. | |
| D755,399 S | 5/2016 | Jones | |
| 9,744,014 B2 | 8/2017 | Smith et al. | |
| 9,744,103 B1 | 8/2017 | Ricker | |
| D804,141 S | 12/2017 | Falcone | |
| D805,262 S | 12/2017 | Pinto et al. | |
| D808,089 S | 1/2018 | Wilson et al. | |
| D817,561 S | 5/2018 | Pater et al. | |
| D821,694 S | 7/2018 | Keen et al. | |
| D852,438 S | 6/2019 | Liu | |
| 10,426,710 B2 | 10/2019 | Jones et al. | |
| 10,448,615 B1 | 10/2019 | Mullin | |
| D890,454 S | 7/2020 | Dertsakyan | |
| D901,104 S | 11/2020 | Dertsakyan | |
| D901,790 S | 11/2020 | He | |
| D905,355 S | 12/2020 | Wang et al. | |
| D911,635 S | 2/2021 | Dertsakyan | |
| D938,051 S | 12/2021 | Velez | |
| 11,304,871 B2 | 4/2022 | Lee et al. | |
| 2004/0237899 A1 | 12/2004 | Fung | |
| 2009/0005810 A1 | 1/2009 | Bonazza | |
| 2009/0078214 A1 | 3/2009 | Mann | |
| 2009/0151643 A1 | 6/2009 | Hodgins | |
| 2013/0255589 A1 | 10/2013 | Wagstaff et al. | |
| 2014/0231606 A1 * | 8/2014 | Sobb | A47F 5/0815 |
| | | | 248/224.8 |
| 2015/0190631 A1 | 7/2015 | Ruflin et al. | |
| 2015/0257366 A1 * | 9/2015 | Gick | A01K 15/026 |
| | | | 119/710 |
| 2016/0262986 A1 | 9/2016 | Jones et al. | |
| 2019/0133082 A1 * | 5/2019 | Becattini, Jr. | A01K 15/026 |
| 2019/0336403 A1 | 11/2019 | Jones et al. | |

OTHER PUBLICATIONS

U.S. Appl. No. 29/864,893 , "Notice of Allowance", dated Jan. 23, 2023, 9 pages.

* cited by examiner

TOY / TRAINING TOOL FOR ANIMAL CONTAINMENT ASSEMBLY

CROSS-REFERENCE TO RELATED APPLICATIONS

This application is a continuation of International Application No. PCT/US2020/061505, filed Nov. 20, 2020, and entitled TOY/TRAINING TOOL FOR ANIMAL CONTAINMENT ASSEMBLY, which claims the benefit of U.S. Provisional Application No. 62/938,597, filed Nov. 21, 2019, and entitled TOY FOR ANIMAL CONTAINMENT ASSEMBLY, both of which are hereby incorporated by reference in their entireties.

TECHNICAL FIELD

The present disclosure relates to the pet industry generally and more specifically to pet crates.

BACKGROUND

Animal enclosures or crates for pets often include a mesh, portals, caging, or other assembly that keeps the animal inside the crate. Occasionally, it is desirable to engage the animal while it is inside the create, for example, to feed the animal, to play with the animal, or to treat the animal. Thus, it can be desirable to produce a toy for the crate that is fun for the animal, can provide a treat for the animal, safe for the animal, easy to install and remove, easy to clean, hypoallergenic, and aesthetically pleasing.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, disclosed herein is a system for engaging an animal in play for a crate assembly, comprising: an animal engagement portion configured to extend into the crate assembly from a mesh network suspended by a support frame of the crate assembly, a mesh network engagement portion configured to allow the system for engaging an animal in play for a crate assembly to lock into the mesh network; and a handle portion configured to lock the crate-mounted animal toy into the mesh network. In some cases, the animal engagement portion comprises a chew toy. In certain examples, the animal engagement portion is configured to provide a treat to the animal (e.g., the animal engagement portion comprises at least one indent configured to hold the treat).

In some examples, at least the one indent comprises at least one raised portion, and can comprise a plurality of raised portions disposed in the animal engagement portion in a pattern. Additionally, at least the one indent further comprises a plurality of voids traversing the animal engagement portion, and the plurality of voids is disposed in the animal engagement portion in a pattern. Thus, the animal engagement portion is configured to make treat retrieval difficult for the animal to provide prolonged engagement with the animal.

In certain aspects, the handle portion and the mesh network engagement portion are further configured to prevent the system for engaging an animal in play for a crate assembly from falling out of the mesh network. In some aspects, the handle portion is further configured to retrieve the system for engaging an animal in play for a crate assembly from the mesh network.

According to certain embodiments of the present invention, also disclosed herein are methods of engaging an animal in play for a crate assembly, comprising applying a treat to a toy configured to be supported by a mesh network suspended by a support frame of the crate assembly; engaging the toy into the mesh network of the crate assembly; and locking the toy into the mesh network. In some cases, applying the treat to the toy comprises placing the treat into at least one indent positioned on the toy. In some examples, inserting the toy into the mesh network of the crate assembly comprises passing an animal engagement portion of the toy through the mesh network of the crate assembly until a mesh network engagement portion of the toy is aligned with the mesh network. In certain cases, rotating the toy to lock the toy into the mesh network comprises rotating the toy from 0° to 179°. Additionally, the methods comprise removing the toy from the mesh network (e.g., removing the toy from the mesh network comprises rotating the toy opposite to rotating the toy to lock the toy into the mesh network and pulling the toy from the mesh network).

According to certain embodiments of the present invention, also disclosed herein is a crate-mounted animal toy, comprising, an animal engagement portion configured to extend into a crate from a mesh network suspended by a support frame of the crate, wherein the animal engagement portion comprises at least one indent configured to hold a treat; a mesh network engagement portion positioned adjacent to the animal engagement portion, wherein the mesh network engagement portion is configured to allow the crate-mounted animal toy to lock into the mesh network; and a handle portion configured to lock the crate-mounted animal toy into the mesh network.

BRIEF DESCRIPTION OF THE DRAWINGS

The specification makes reference to the following appended figures, in which use of like reference numerals in different figures is intended to illustrate like or analogous components.

DETAILED DESCRIPTION

Certain aspects and features of the present disclosure relate to pet containment and engaging a contained pet in play. The embodiments of the present disclosure described below are not intended to be exhaustive or to limit the disclosure to the precise forms described herein. Rather, the embodiments described herein are chosen so that a person of skill in the art can appreciate and understand the principles and practices of the present disclosure.

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

As used herein, the meaning of "a," "an," or "the" includes singular and plural references unless the context clearly dictates otherwise.

All ranges disclosed herein are to be understood to encompass both endpoints and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

As used herein, directional and spatial terms such as "horizontal," "vertical," "horizontally," "vertically," "outward," and "upward" are not intended to be binding terms.

As used herein, "toy" may include, but is not limited to, a plaything, a training tool, a training aid, an instructional tool, a positive reinforcement (e.g., a reward), any suitable animal interaction device, or any combination thereof.

Figure 1:
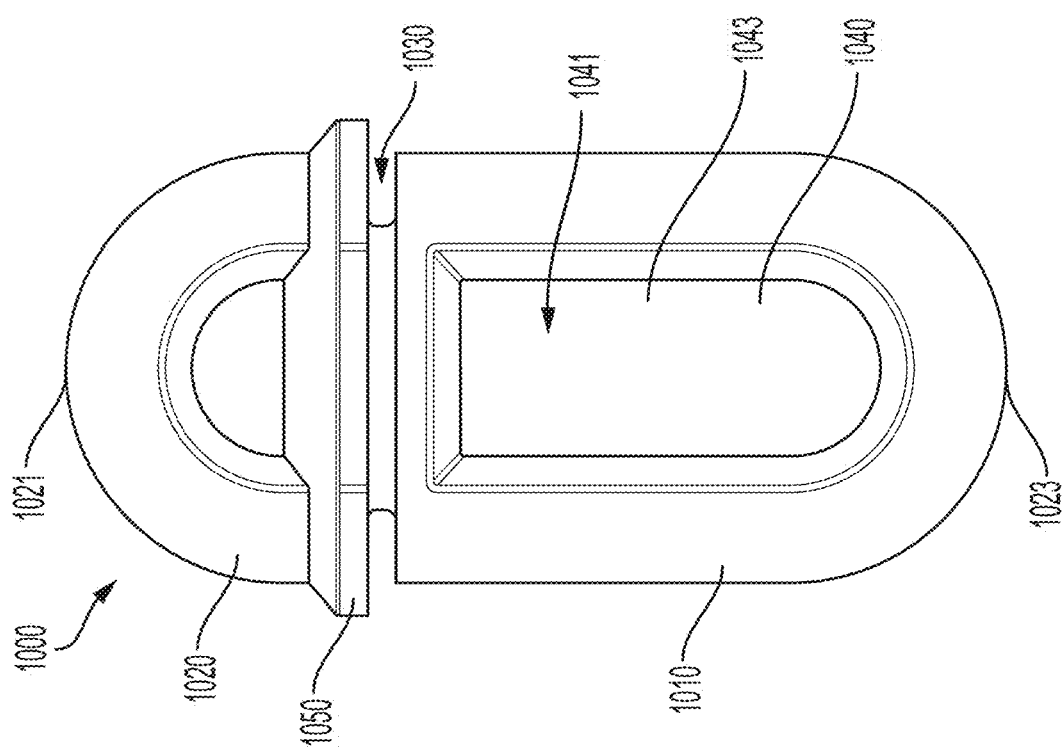
FIG. 1 is a front view of an animal toy according to certain aspects of the present disclosure.

A representative embodiment is presented in FIG. 1. In some embodiments, a toy 1000 is suitable for use in a collapsible crate assembly according to PCT Publication No WO 2018/169693 A1, hereby incorporated by reference in its entirety. While a toy 1000 designed to accompany the collapsible crate system described in the WO 2018/169693 publication is described throughout the text, the methods and articles apply to any animal containment system. In some examples, the animal containment system is a wire cage, a non-collapsible polymer crate, a travel crate, a decorative crate, a multifunctional crate, or the like.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

Figure 2:
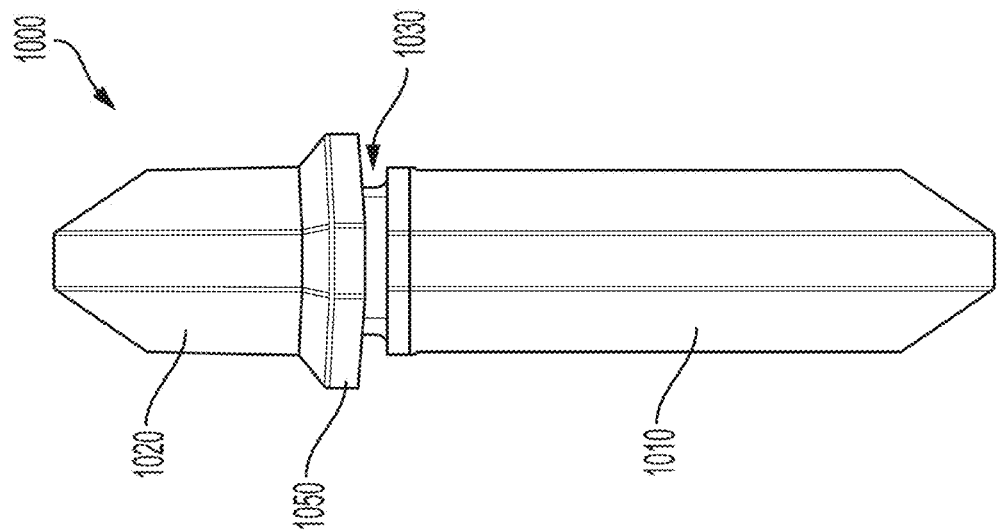
FIG. 2 is a side view of an animal toy according to certain aspects of the present disclosure.

According to certain embodiments of the present invention, the toy 1000 described herein is shown in FIGS. 1-3. In certain examples, the toy 1000 includes an animal engagement portion 1010, a handle portion 1020 (also referred to herein as a base portion), and a mesh network engagement portion 1030 (also referred to herein as a support portion). The toy 1000 includes a first end 1021 and a second end 1023 opposite the first end 1021. The animal engagement portion 1010 can be a chew toy and/or a treat delivery system. In certain aspects, the animal engagement portion 1010 includes at least one indent 1040 comprising a recessed surface 1043 and defining a recessed area 1041. The indent 1040 can be used to provide a treat to the animal. For example, a spreadable treat (e.g., peanut butter) can be applied to the indent 1040. In other examples, the indent 1040 can be configured to securely hold a dry treat (e.g., kibble). The indent 1040 can be positioned on a first side of the toy 1000, or the indent 1040 can be positioned on a first side of the toy 1000 and a second side of the toy 1000. The indent 1040 can have any suitable depth such that a treat (e.g., a spreadable treat or a dry treat) can be contained in the indent 1040.

The handle portion 1020 provides a grip that a user can use to handle the toy 1000 (e.g., to apply the treat, to deploy the toy 1000 into the mesh network of a crate, and to lock the toy 1000 into the mesh network, as described in detail below). The handle portion 1020 can include a stop 1050 configured to prevent the toy 1000 from completely passing through the mesh network of the crate. As best illustrated in FIGS. 3D and 3E, the stop 1050 includes a stop surface 1051. The mesh network engagement portion 1030 is configured to enable the user to lock the toy 1000 into the mesh network such that the animal can engage the toy 1000 and not remove the toy 1000 from the mesh network. FIG. 2 is a side view of the toy 1000 depicting the animal engagement portion 1010, the handle portion 1020, the mesh network engagement portion 1030, and the stop 1050. In certain aspects, the mesh network engagement portion can have indentations configured to engage cross-members that provide the mesh network, as described below. For example, the stop 1050 can have indentations that align with and engage the mesh network when the toy 1000 is in a locked configuration.

Figure 3A:
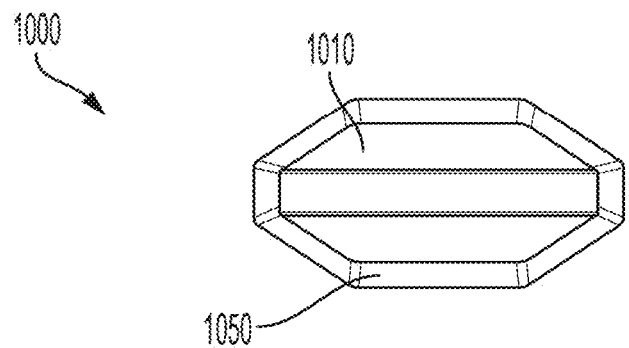
FIGS. 3A 3C are a bottom view of a toy according to certain aspects of the present disclosure.
Figure 3B:
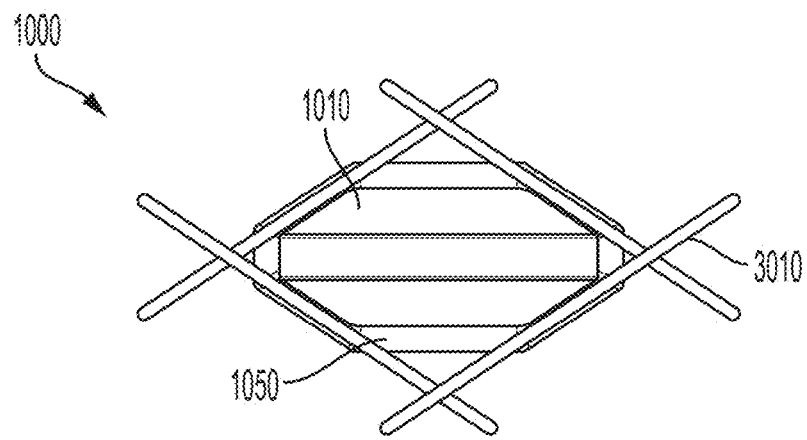
FIGS. 3D-E are views of a mesh network engagement portion according to certain aspects of the present disclosure.
Figure 3C:
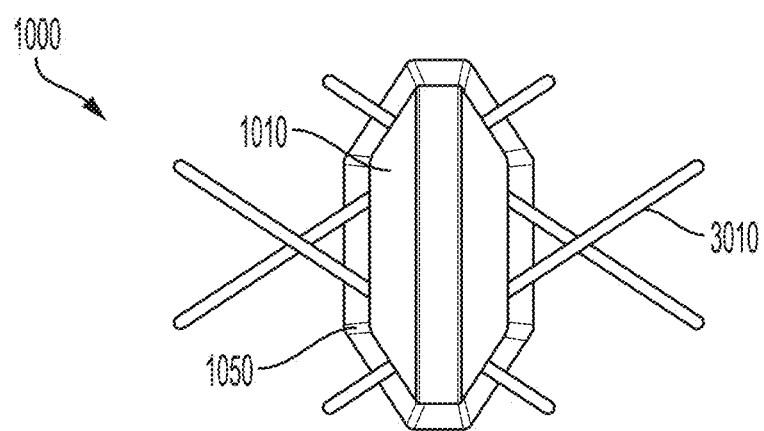
Figure 3D:
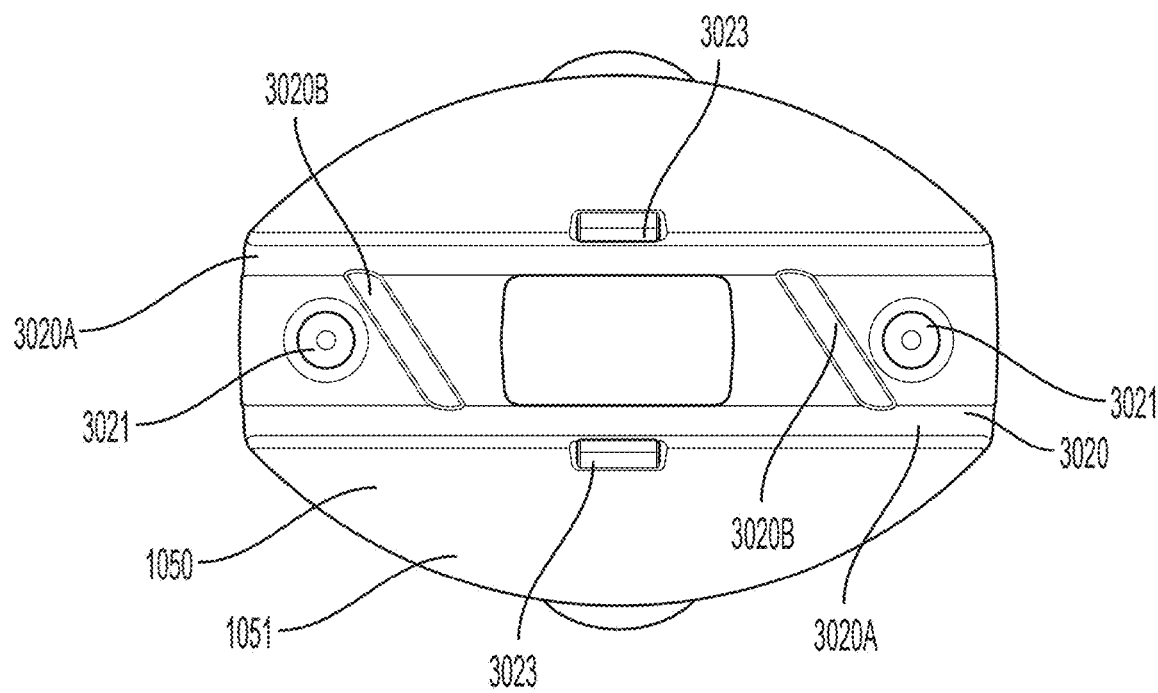
Figure 3E:
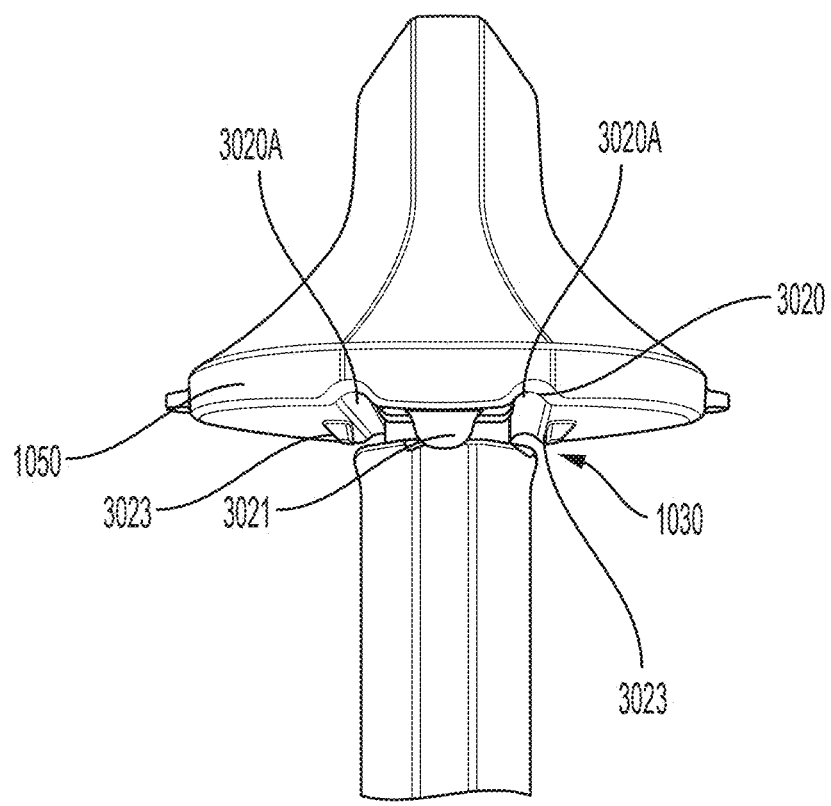

FIG. 3A is a bottom view of the toy 1000 depicting the animal engagement portion 1010 and the stop 1050. FIG. 3B is a bottom view of the toy 1000 depicting the toy 1000 inserted into a mesh network 3010. As shown in FIG. 3B, the animal engagement portion 1010 is configured to be inserted into the mesh network 3010 until the stop 1050 contacts the mesh network 3010, prohibiting the toy 1000 from passing completely through the mesh network 3010. The toy 1000 can be locked into the mesh network 3010 by rotating the toy 1000 as shown in FIG. 3C. In some cases, the animal engagement portion 1010 and the handle portion 1020 can engage the mesh network 3010 about the mesh network engagement portion 1030. Accordingly, the mesh network engagement portion 1030 can be configured to conform to the mesh network 3010 when the toy 1000 is rotated and locked into the mesh network 3010. Thus, the animal can engage the toy 1000 without removing the toy 1000 from the mesh network 3010, and the toy 1000 is prevented from falling out of the mesh network 3010. FIG. 3D is a cross-sectional view of the stop 1050. As shown in FIG. 3D, the stop 1050 can have indentations 3020 on the stop surface 1051 configured to engage the cross-members of a mesh network 3010. Accordingly, the indentations 3020 can be provided having any suitable configuration such that the toy 1000 can be deployed in any animal crate assembly, including animal crate assemblies having vertical cage members, horizontal cage members, a diamond pattern mesh network, a rectangular pattern mesh network, any suitable animal containment members, or any combination thereof. In the embodiment illustrated in FIG. 3D, the indentations 3020 include first indentations 3020A and second indentations 3020B where the second indentations 3020B extend at an oblique angle relative to the first indentations 3020A. FIG. 3E is a side view of the toy 1000 showing the stop 1050 and the indentations 3020 configured to engage the mesh network 3010 at the mesh network engagement portion 1030 in some embodiments, and as illustrated in FIGS. 3D and 3E, the stop 1050 may include first ribs 3023 on the stop surface 1051 adjacent to the indentations 3020 and/or may include spacers 3021 on the stop surface 1051.

Figure 4:
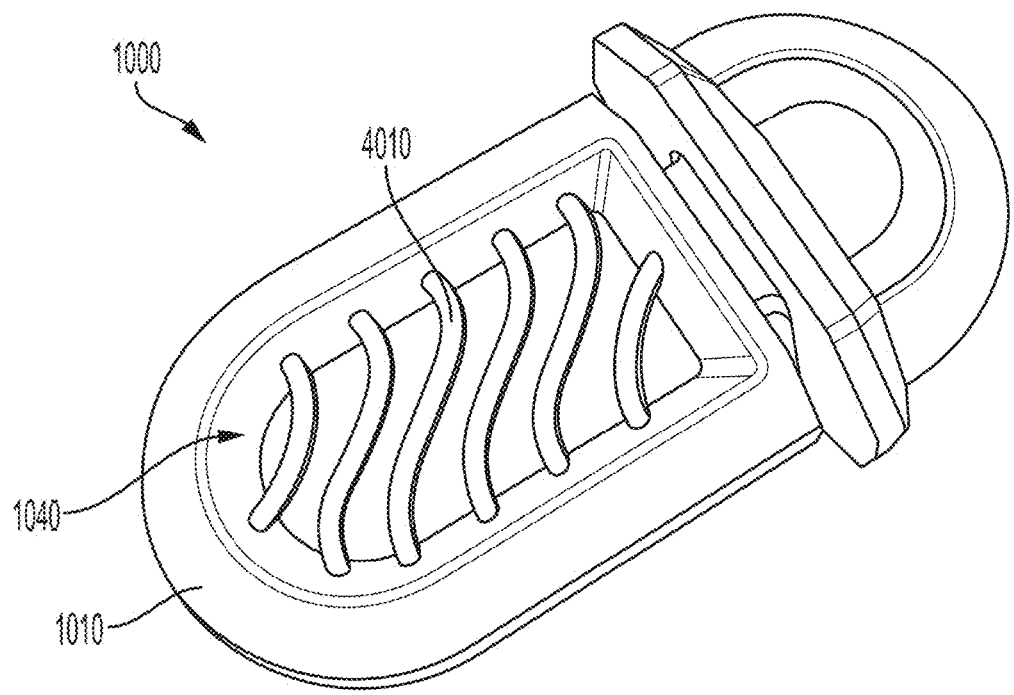
FIG. 4 is a perspective view of an animal toy according to certain aspects of the present disclosure.
Figure 5:
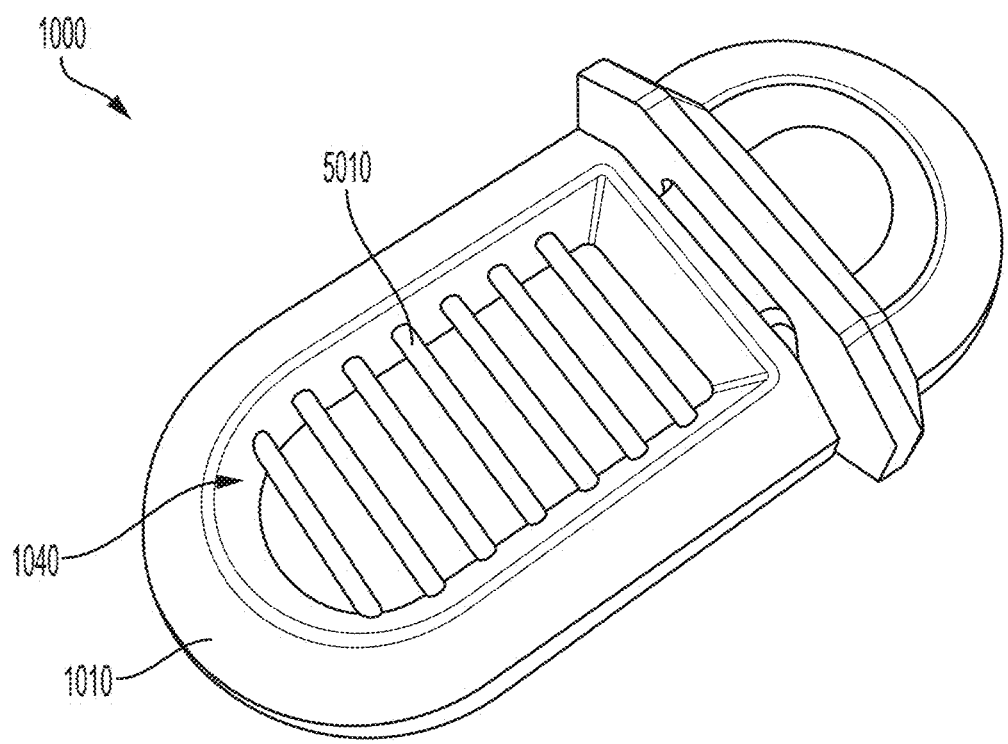
FIG. 5 is a perspective view of an animal toy according to certain aspects of the present disclosure.
Figure 6:
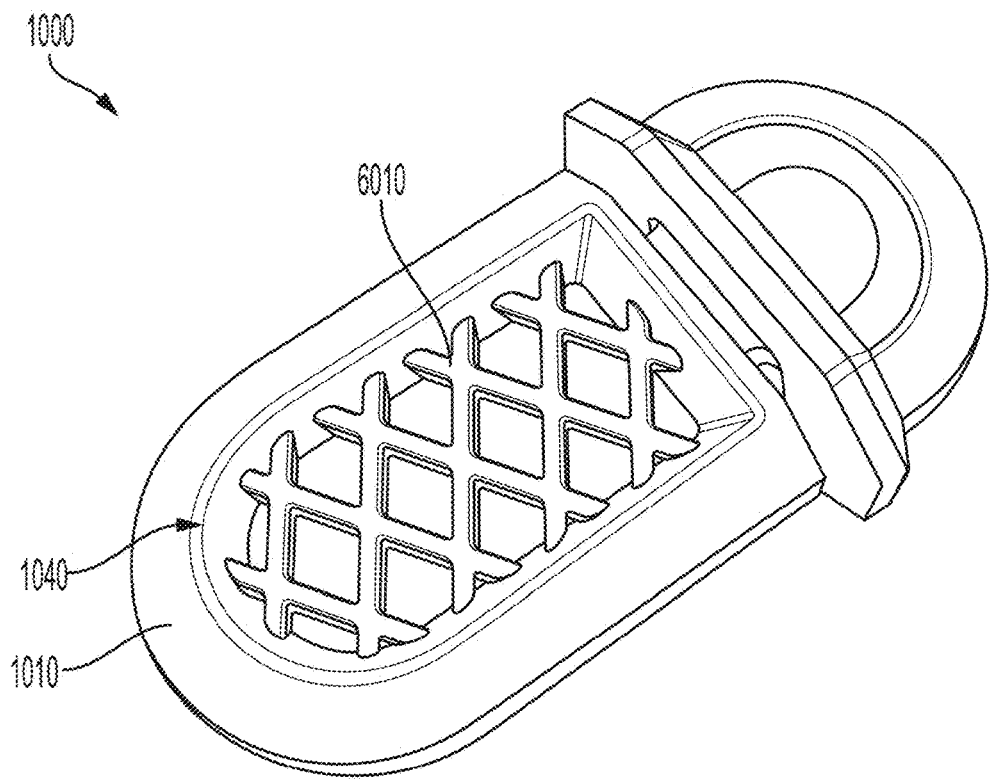
FIG. 6 is a perspective view of an animal toy according to certain aspects of the present disclosure.
Figure 7:
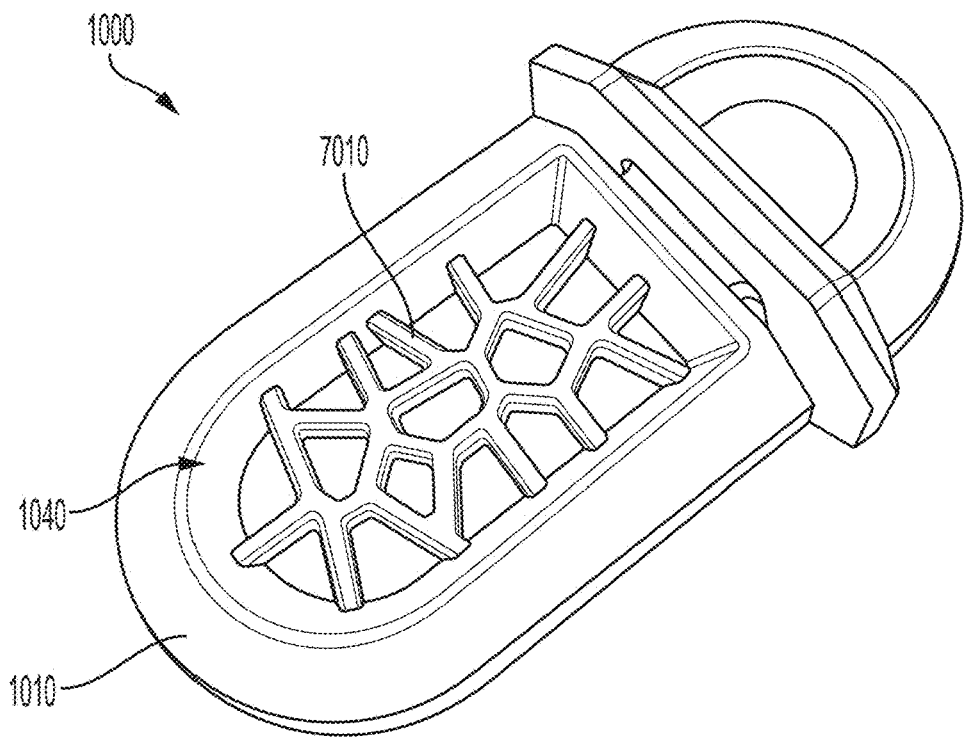
FIG. 7 is a perspective view of an animal toy according to certain aspects of the present disclosure.
Figure 8:
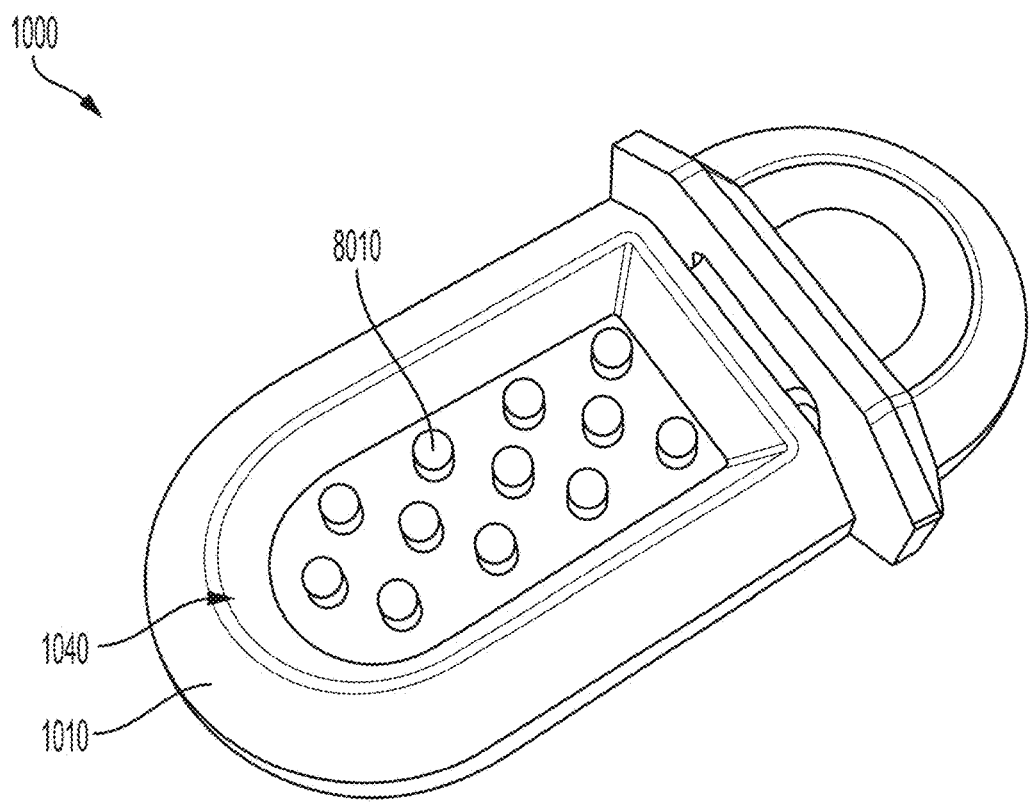
FIG. 8 is a perspective view of an animal toy according to certain aspects of the present disclosure.

In certain embodiments, the toy 1000 can be textured to make retrieval of the treat more difficult for the animal. For example, the indent 1040 can include at least one raised portion (e.g., a raised pattern), and optionally can include a plurality of raised portions, to create an uneven surface that can retain the treat while the animal is trying to retrieve it. The plurality of raised portions can be provided in any suitable pattern, including a dot pattern, a tread pattern, a wave pattern, a diamond pattern, a network pattern, any suitable pattern, or any combination thereof. For example, FIG. 4 shows the indent 1040 having a plurality of raised portions in a wave pattern 4010, FIG. 5 shows the indent 1040 having a plurality of raised portions in a tread pattern 5010, FIG. 6 shows the indent 1040 having a plurality of raised portions in a diamond pattern 6010, FIG. 7 shows the indent 1040 having a plurality of raised portions in a network pattern (e.g., a pattern in the example of a neural network, a polymer network, a cellular network, or any suitable network pattern), and FIG. 8 shows the indent 1040 having a plurality of raised portions in a dot pattern 8010. Thus, the plurality of raised portions, in any suitable pattern, can provide areas where a spreadable treat (e.g., peanut butter) can be difficult for the animal to retrieve. Accordingly, the animal will continue to try to retrieve the treat and the toy 1000 as described herein can occupy the animal for a longer period of time when compared to a toy that is devoid of a raised pattern.

Figure 9:
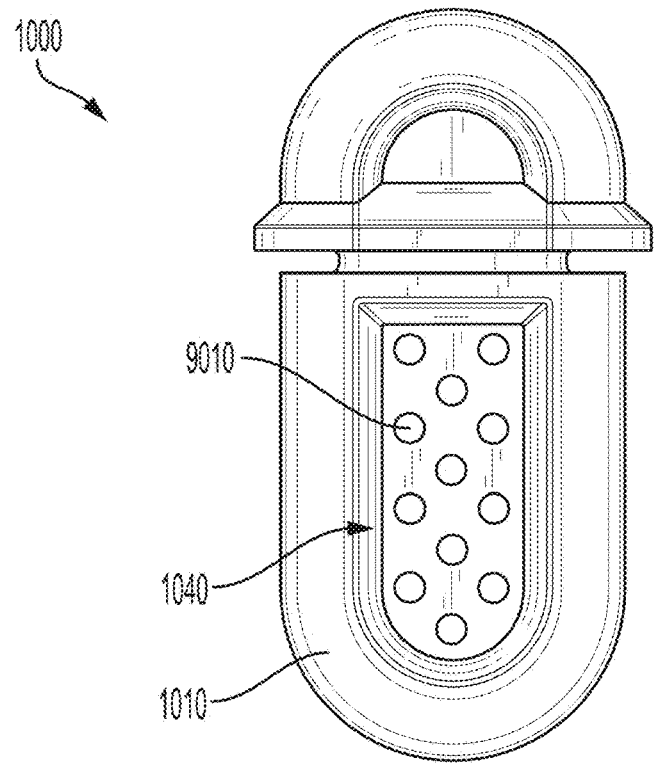
FIG. 9 is a front view of an animal toy according to certain aspects of the present disclosure.
Figure 10:
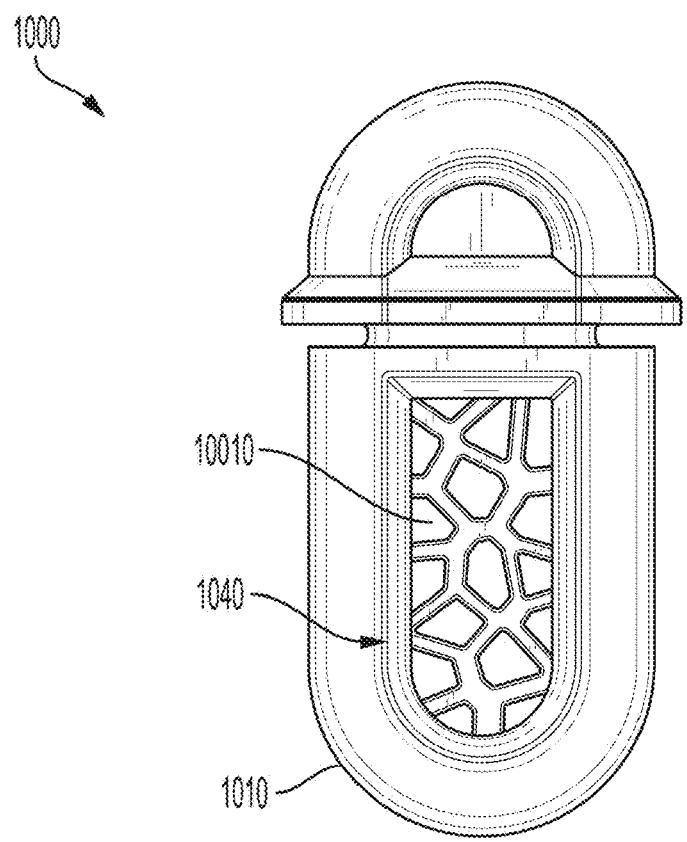
FIG. 10 is a front view of an animal toy according to certain aspects of the present disclosure.

In some further embodiments, the toy 1000 can include an indent 1040 that includes at least one void traversing the thickness of the toy 1000 (i.e., the indent 1040 includes at least one hole configured to contain the treat), and can include a plurality of voids traversing the thickness of the toy 1000 as in the example of FIGS. 9 and 10. The voids in the indent 1040 can be provided in any suitable pattern, including a dot pattern, a tread pattern, a wave pattern, a diamond pattern, a network pattern, or any combination thereof. For example, FIG. 9 shows the indent 1040 having voids in a dot pattern 9010, and FIG. 10 shows the indent 1040 having voids in a network pattern 10010. Thus, the plurality of voids, in any suitable pattern, can provide areas where a spreadable treat (e.g., peanut butter) can be difficult for the animal to retrieve. Accordingly, the animal will continue to try to retrieve the treat and the toy 1000 as described herein can occupy the animal for a longer period of time when compared to a toy that is devoid of a void.

Figure 11:
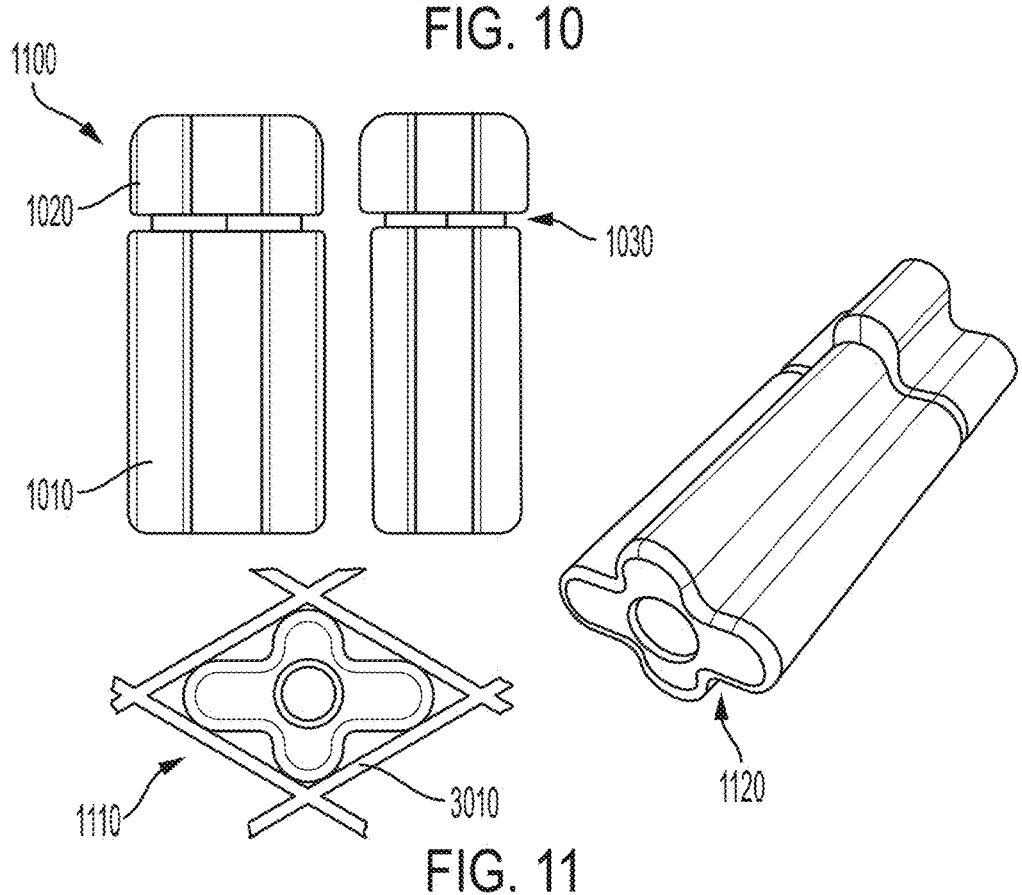
FIG. 11 is a plurality of views of an animal toy according to certain aspects of the present disclosure.

In other embodiments, the toy 1000 can have any suitable configuration such that the toy 1000 can be inserted into the mesh network 3010 of a crate assembly, locked into the mesh network 3010, and provide a treat to an animal. For example, FIG. 11 shows a cross-shaped toy 1100 having an optional cross-shaped cross-section, as shown in the bottom view 1110. The cross-shaped toy 1100 includes the animal engagement portion 1010, the handle portion 1020, and the mesh network engagement portion 1030. Additionally, the cross-shaped toy 1100 can be locked into the mesh network 3010 by inserting the cross-shaped toy 1100 into the mesh network 3010 until the mesh network engagement portion 1030 aligns with the mesh network 3010 and rotating the cross-shaped toy 1100. In some cases, the concave portions 1120 can be used to provide a spreadable treat (e.g., peanut butter) to the animal.

Figure 12:
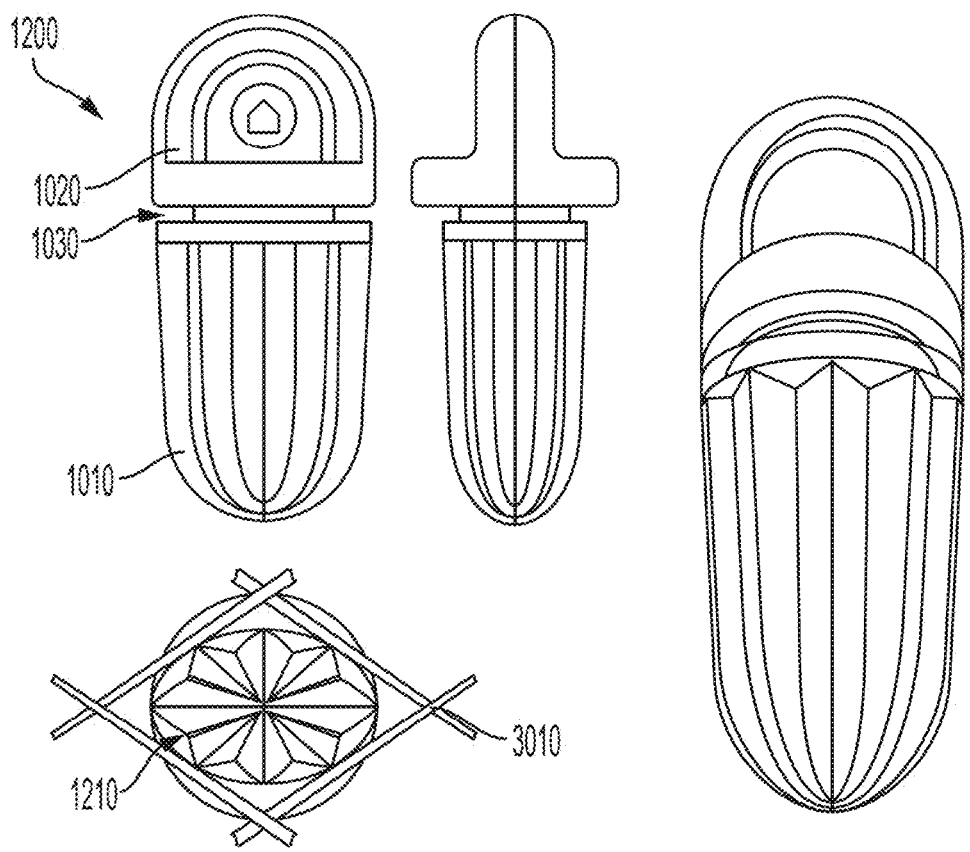
FIG. 12 is a plurality of views of an animal toy according to certain aspects of the present disclosure.
Figure 13:
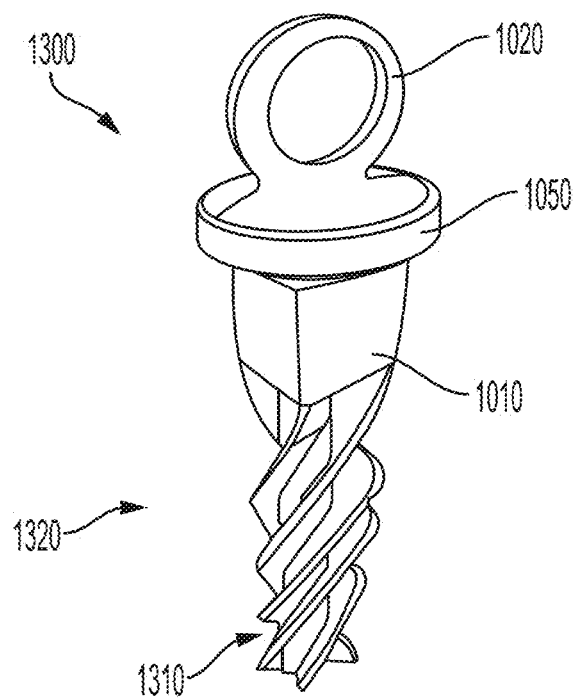
FIG. 13 is a perspective view of an animal toy according to certain aspects of the present disclosure.
Figure 14:
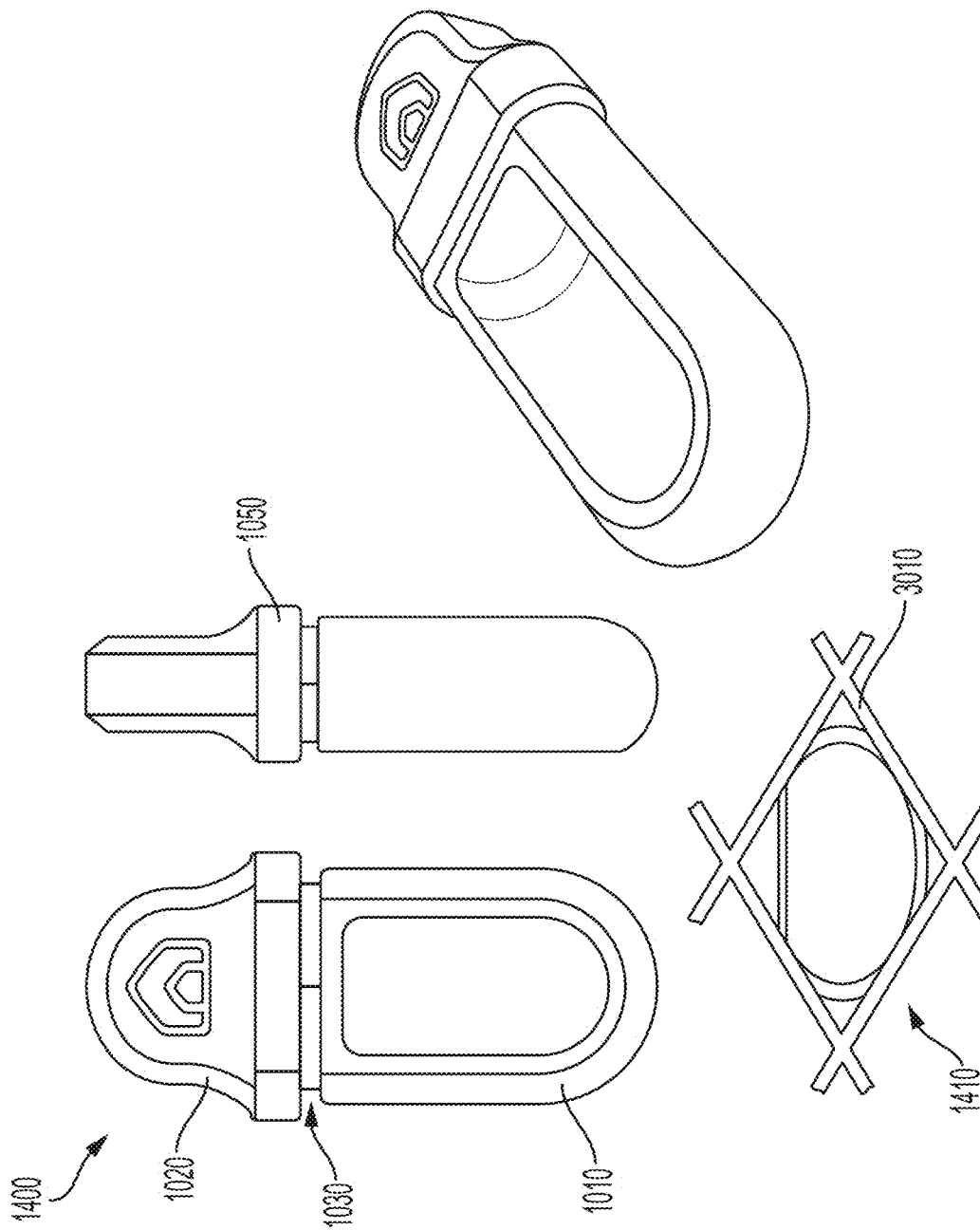
FIG. 14 is a plurality of views of an animal toy according to certain aspects of the present disclosure.

In some further examples, FIG. 12 shows a toy 1200 having a plurality of grooves 1210 such that a spreadable treat can be placed in at least one groove 1210 in the plurality of grooves 1210, the spreadable treat can be placed in every groove 1210 in the plurality of grooves 1210, or any number in between. Further, FIG. 13 shows a toy 1300 having a plurality of grooves 1310 provided in a screw pattern 1320. In some other examples, FIG. 14 shows a curved toy 1400 having a curved cross-section as shown in a bottom view 1410. The curved toy 1400 includes the animal engagement portion 1010, the handle portion 1020, and the mesh network engagement portion 1030. Additionally, the curved toy 1400 can be locked into the mesh network 3010 by inserting the curved toy 1400 until the stop 1050 contacts the mesh network 3010 and rotating the curved toy 1400. Thus, any suitable shape can be used to provide the animal engagement portion 1010 of the system for engaging an animal in play for a crate assembly described herein.

In certain examples, the toy 1000 is a polymer, a metal, a composite, wood, a ceramic, rawhide, bone, or any combination thereof. For example, the polymer can be high density polyethylene (HDPE), polypropylene (PP), polystyrene (PS), poly(methyl methacrylate) (PMMA), natural rubber, synthetic rubber, any suitable polymer, or any combination thereof. In certain cases, the toy 1000 is a rigid material or a flexible material. For example, the toy 1000 can be a rigid material such that an animal can chew on the toy 1000 without damaging the toy 1000. Optionally, the toy 1000 can be a flexible material such that the animal can chew on the toy 1000, can bat at the toy 1000, and can nuzzle the toy 1000.

Deploying the toy 1000 can include applying a treat to the toy 1000, inserting the toy 1000 into the mesh network 3010 of a crate assembly, and rotating the toy 1000 to lock the toy 1000 into the mesh network 3010. In some cases, applying the treat to the toy comprises placing the treat into the at least one indent 1040. For example, peanut butter can be spread into the indent 1040. After a treat is applied to the toy 1000, the toy 1000 can be inserted into the mesh network 3010 of the crate assembly. Accordingly, the animal engagement portion 1010 of the toy 1000 can be inserted into the mesh network 3010 until the mesh network engagement portion 1030 of the toy 100 is aligned with the mesh network 3010. In some examples, the animal engagement portion 1010 can be inserted into the mesh network 3010 until the stop 1050 contacts the mesh network.

After inserting the toy 1000 into the mesh network 3010, the toy 1000 can be rotated to lock the toy 1000 into the mesh network 3010 as in the example of FIG. 3C. The toy 1000 can be rotated from about 0° to about 179° (e.g., from about 1° to about 170°, from about 5° to about 165°, from about 20° to about 160°, from about 30° to about 150°, from about 45° to about 135°, from about 60° to about 120°, or about 90°) such that the animal engagement portion 1010 and the handle portion 1020 engage the mesh network 3010 as shown in FIG. 3C. Additionally, the methods comprise removing the toy 1000 from the mesh network 3010 (e.g., removing the toy 1000 from the mesh network 3010 comprises rotating the toy 1000 in a direction opposite to the direction the toy 1000 was rotated to lock the toy 1000 into the mesh network 3010, or rotating the toy 1000 to 180° from the insertion configuration to align the toy 1000 for removal). After the toy 1000 is aligned for removal, the toy 1000 can be removed from the mesh network 3010 by pulling the handle portion 1020.

In certain embodiments, described herein is a crate-mounted animal toy for engaging an animal (e.g., a pet) in play while the animal is in a crate. The crate-mounted animal toy can be inserted into the mesh network of a crate to provide an off-the-ground design that provides a treat to an animal inside the crate and helps keep a bottom of the crate or an animal bed placed in the crate clean by not encouraging the animal to lick or chew the bed. Additionally, the crate-mounted animal toy described herein can engage the animal in play outside of the crate, for example, providing an elevated toy or treat delivery system.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Illustration 1 is a system for engaging an animal in play for a crate assembly, comprising: an animal engagement portion configured to extend into the crate assembly from a mesh network suspended by a support frame of the crate assembly, a mesh network engagement portion configured to allow the system for engaging an animal in play for a crate assembly to lock into the mesh network, and a handle portion configured to lock the crate-mounted animal toy into the mesh network.

Illustration 2 is the system for engaging an animal in play for a crate assembly of any preceding or subsequent illustration, wherein the animal engagement portion comprises a chew toy.

Illustration 3 is the system for engaging an animal in play for a crate assembly of any preceding or subsequent illustration, wherein the animal engagement portion is configured to provide a treat to the animal.

Illustration 4 is the system for engaging an animal in play for a crate assembly of any preceding or subsequent illustration, wherein the animal engagement portion comprises at least one indent configured to hold the treat.

Illustration 5 is the system for engaging an animal in play for a crate assembly of any preceding or subsequent illustration, wherein at least the one indent comprises at least one raised portion.

Illustration 6 is the system for engaging an animal in play for a crate assembly of any preceding or subsequent illustration, further comprising a plurality of raised portions, wherein the plurality of raised portions is disposed in the animal engagement portion in a pattern.

Illustration 7 is the system for engaging an animal in play for a crate assembly of any preceding or subsequent illustration, wherein at least the one indent further comprises a plurality of voids traversing the animal engagement portion.

Illustration 8 is the system for engaging an animal in play for a crate assembly of any preceding or subsequent illustration, wherein the plurality of voids is disposed in the animal engagement portion in a pattern.

Illustration 9 is the system for engaging an animal in play for a crate assembly of any preceding or subsequent illustration, wherein the animal engagement portion is configured to make treat retrieval difficult for the animal to provide prolonged engagement with the animal.

Illustration 10 is the system for engaging an animal in play for a crate assembly of any preceding or subsequent illustration, wherein the handle portion and the mesh network engagement portion prevent the animal from pulling the system for engaging an animal in play for a crate assembly into the crate assembly.

Illustration 11 is the system for engaging an animal in play for a crate assembly of any preceding or subsequent illustration, wherein the handle portion and the mesh network engagement portion prevent the system for engaging an animal in play for a crate assembly from falling out of the mesh network.

Illustration 12 is the system for engaging an animal in play for a crate assembly of any preceding or subsequent illustration, wherein the handle portion is further configured to retrieve the system for engaging an animal in play for a crate assembly from the mesh network.

Illustration 13 is a method of engaging an animal in play for a crate assembly according to any preceding or subsequent illustration, comprising: applying a treat to a toy configured to be supported by a mesh network suspended by a support frame of the crate assembly; engaging the toy into the mesh network of the crate assembly; and locking the toy into the mesh network.

Illustration 14 is the method of engaging an animal in play for a crate assembly of any preceding or subsequent illustration, wherein applying the treat to the toy comprises placing the treat into at least one indent positioned on the toy.

Illustration 15 is the method of engaging an animal in play for a crate assembly of any preceding or subsequent illustration, wherein engaging the toy into the mesh network of the crate assembly comprises positioning an animal engagement portion of the toy in the mesh network of the crate assembly such that a mesh network engagement portion of the toy is aligned with the mesh network.

Illustration 16 is the method of engaging an animal in play for a crate assembly of any preceding or subsequent illustration, wherein locking the toy into the mesh network comprises rotating the toy from 0° to 179°.

Illustration 17 is the method of engaging an animal in play for a crate assembly of any preceding or subsequent illustration, wherein locking the toy into the mesh network comprises attaching a locking portion to the mesh network engagement portion.

Illustration 18 is the method of engaging an animal in play for a crate assembly of any preceding or subsequent illustration, further comprising removing the toy from the mesh network.

Illustration 19 is the method of engaging an animal in play for a crate assembly of any preceding or subsequent illustration, wherein removing the toy from the mesh network comprises rotating the toy opposite to rotating the toy to lock the toy into the mesh network and pulling the toy from the mesh network.

Illustration 20 is a crate-mounted animal toy according to any preceding illustration, comprising: an animal engagement portion configured to extend into a crate from a mesh network suspended by a support frame of the crate, wherein the animal engagement portion comprises at least one indent configured to hold a treat; a mesh network engagement portion positioned adjacent to the animal engagement portion, wherein the mesh network engagement portion is configured to allow the crate-mounted animal toy to lock into the mesh network; and a handle portion configured to lock the crate-mounted animal toy into the mesh network.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims

What is claimed is:

1. An animal interaction device comprising:
a base portion defining a first end of the animal interaction device, wherein the base portion comprises a stop comprising a stop surface, a plurality of indentations extending into the stop surface, and a plurality of protrusions extending from the stop surface, wherein a width of the base portion is less than a width of the stop, wherein the plurality of indentations comprises at least one first indentation extending at least partially along a first line and at least one second indentation extending at least partially along a second line, and wherein the second line is at an oblique angle relative to the first line;
an animal engagement portion defining a second end of the animal interaction device; and
a support portion extending between the stop and the animal engagement portion;
wherein at least the stop surface and the animal engagement portion are configured to selectively lock the animal interaction device into a mesh network;
wherein the stop surface extends perpendicular to a longitudinal axis of the animal interaction device and forms a rim extending around a perimeter of a first end of the support portion; and
wherein the longitudinal axis extends from the first end to the second end.

2. The animal interaction device of claim 1, wherein the plurality of indentations comprises at least one third indentation extending at least partially along a third line that is parallel to the first line and arranged on the opposite side of the support portion from the at least one first indentation.

3. The animal interaction device of claim 2, wherein the plurality of indentations comprises at least one fourth indentation extending at least partially along a fourth line that is parallel to the second line and arranged on the opposite side of the support portion from the at least one second indentation.

4. The animal interaction device of claim 1, wherein at least one indentation of the plurality of indentations on the stop surface is configured to engage a cross member of the mesh network.

5. The animal interaction device of claim 1, wherein the plurality of protrusions comprises at least one rib arranged adjacent to at least one indentation of the plurality of indentations.

6. The animal interaction device of claim 1, wherein the plurality of indentations comprises at least two indentations extending in a first direction, and wherein the stop further comprises at least one spacer on the stop surface between the at least two indentations extending in the first direction.

7. The animal interaction device of claim 1, wherein the animal interaction device is rotatable between a locking configuration and an insertion configuration, wherein, in the locking configuration, the animal interaction device is configured to lock into the mesh network, wherein, in the insertion configuration, the animal interaction device is removable from the mesh network, and wherein an orientation of the base portion in the locking configuration is different from an orientation of the base portion in the insertion configuration.

8. An animal interaction device comprising:
a base portion defining a first end of the animal interaction device and comprising a stop comprising a stop surface and a plurality of protrusions extending from the stop surface, wherein at least two first protrusions are aligned along a first axis of the stop surface and at least two second protrusions are aligned along a second axis of the stop surface, wherein the first axis of the stop surface is perpendicular to the second axis of the stop surface;
an animal engagement portion defining a second end of the animal interaction device, wherein the animal engagement portion comprises an indent and a wall, wherein the indent comprises a recessed surface and defines a recessed area, and wherein the wall extends entirely around the recessed area; and
a support portion extending between the stop and the animal engagement portion;
wherein at least the stop and the animal engagement portion are configured to selectively lock the animal interaction device into a mesh network; and
wherein at least a portion of the stop forms a rim around a perimeter of a first end of the support portion.

9. The animal interaction device of claim 8, wherein the recessed area comprises at least one raised portion within the recessed area.

10. The animal interaction device of claim 8, wherein the recessed surface defines a plurality of apertures.

11. The animal interaction device of claim 8, wherein the stop surface further comprises a plurality of indentations comprising at least one first indentation extending in a first direction and at least one second indentation extending in a second direction different from the first direction, and wherein the at least one first indentation is arranged at least partially between the at least two first protrusions and the at least one second indentation is arranged at least partially between the at least two second protrusions.

12. The animal interaction device of claim 11, wherein the second direction intersects the first direction.

13. The animal interaction device of claim 8, wherein the animal interaction device is configured to selectively retain at least a portion of the mesh network between the base portion and the animal engagement portion.

14. The animal interaction device of claim 8, wherein the animal interaction device is rotatable between a locking configuration and an insertion configuration, wherein, in the locking configuration, the animal interaction device is configured to lock into the mesh network, wherein, in the insertion configuration, the animal interaction device is removable from the mesh network, and wherein an orientation of the base portion in the locking configuration is different from an orientation of the base portion in the insertion configuration.

15. An animal interaction device comprising:
a base portion defining a first end of the animal interaction device and comprising a stop comprising a stop surface, a plurality of indentations extending into the stop surface, and a plurality of protrusions extending from the stop surface;
an animal engagement portion defining a second end of the animal interaction device, wherein the stop surface extends perpendicular to a longitudinal axis of the animal interaction device, wherein the longitudinal axis extends from the first end to the second end; and
a support portion extending between the stop and the animal engagement portion and configured to extend through a mesh network,
wherein a first indentation of the plurality of indentations is arranged between a first side of the support portion and a first protrusion of the plurality of protrusions, a second indentation of the plurality of indentations is arranged between a second side of the support portion and a second protrusion of the plurality of protrusions, and a third indentation of the plurality of indentations is arranged between a third side of the support portion and a third protrusion of the plurality of protrusions,
wherein the stop surface forms a rim extending around a perimeter of a first end of the support portion,
wherein the animal interaction device is rotatable between a locking configuration and an insertion configuration,
wherein, in the locking configuration, the animal interaction device is configured to lock into the mesh network,
wherein, in the insertion configuration, the animal interaction device is removable from the mesh network, and
wherein an orientation of the base portion in the locking configuration is different from an orientation of the base portion in the insertion configuration.

16. The animal interaction device of claim 15, wherein the animal engagement portion comprises an indent comprising a recessed surface and defining a recessed area, the animal engagement portion further comprising a plurality of raised portions within the recessed area and extending from the recessed surface.

17. The animal interaction device of claim 15, wherein a fourth indentation of the plurality of indentations is arranged between a fourth side of the support portion and a fourth protrusion of the plurality of protrusions.

18. The animal interaction device of claim 15, wherein an orientation of the animal engagement portion in the locking configuration is different from an orientation of the animal engagement portion in the insertion configuration.

19. The animal interaction device of claim 15, wherein the orientation of the base portion in the locking configuration is rotated from the orientation of the base portion in the insertion configuration by a rotation angle of greater than 0° to less than 180°.

20. The animal interaction device of claim 19, wherein the rotation angle between the orientation of the base portion in the locking configuration and the orientation of the base portion in the insertion configuration is 90°.

* * * * *